United States Patent
Ward et al.

(10) Patent No.: US 9,902,447 B2
(45) Date of Patent: Feb. 27, 2018

(54) ADHESION SYSTEM FOR A CLIMBING VEHICLE

(71) Applicants: University of Technology, Sydney, Broadway, New South Wales (AU); Roads and Maritime Services, New South Wales (AU)

(72) Inventors: Peter Kenneth Ward, Sydney (AU); Dikai Liu, Sydney (AU)

(73) Assignees: UNIVERSITY OF TECHNOLOGY, SYDNEY, New South Wales (AU); ROADS AND MARITIME SERVICES, New South Wales (AU)

( * ) Notice: Subject to any disclaimer, the term of this patent is extended or adjusted under 35 U.S.C. 154(b) by 0 days.

(21) Appl. No.: 14/904,653

(22) PCT Filed: Jul. 14, 2014

(86) PCT No.: PCT/AU2014/000719
§ 371 (c)(1),
(2) Date: Jan. 12, 2016

(87) PCT Pub. No.: WO2015/003221
PCT Pub. Date: Jan. 15, 2015

(65) Prior Publication Data
US 2016/0159420 A1    Jun. 9, 2016

(30) Foreign Application Priority Data

Jul. 12, 2013 (AU) .............................. 2013902595

(51) Int. Cl.
*B62D 57/024* (2006.01)
*B62D 57/02* (2006.01)
*B25J 5/00* (2006.01)

(52) U.S. Cl.
CPC .............. *B62D 57/024* (2013.01); *B25J 5/00* (2013.01); *B62D 57/02* (2013.01)

(58) Field of Classification Search
CPC ........... B62D 57/024; B62D 57/02; B25J 5/00
See application file for complete search history.

(56) References Cited

U.S. PATENT DOCUMENTS

| 7,762,362 B2 * | 7/2010 | Cutkosky | ............. | B62D 57/024 |
| | | | | 180/8.1 |
| 2005/0072612 A1 * | 4/2005 | Maggio | ............. | B62D 49/0635 |
| | | | | 180/164 |

(Continued)

FOREIGN PATENT DOCUMENTS

| CN | 100450856 | 1/2009 |
| DE | 102006022397 | 11/2007 |

(Continued)

OTHER PUBLICATIONS

Xu, Z., & Ma, P. (2002). A wall-climbing robot for labelling scale of oil tank's volume. Robotica, 20(02), 209-212.

(Continued)

*Primary Examiner* — Joseph M Rocca
*Assistant Examiner* — Gabriela C Craciun
(74) *Attorney, Agent, or Firm* — Klarquist Sparkman LLP

(57) ABSTRACT

A system for selective anchoring a climbing vehicle or robot to a surface of a structure. The system includes a foot (1) having at least one surface contacting toe assembly (2). The toe assembly includes a magnetic adhesion system transitionable between an engageable state, wherein said adhesion system is configured to actively hold said toe to the surface on a plane of engagement thereby anchoring said foot to the structure, and a disengageable state to allow detachment of said foot from said surface. The adhesion system includes a magnetic field generator for projecting a magnetic field outwardly from the plane of engagement toward said (Continued)

engaged surface when the adhesion system is in the engageable state, to thereby generate a magnetic attractive force between the module and a magnetic target material within or beneath the surface of the structure.

21 Claims, 13 Drawing Sheets

(56) References Cited

U.S. PATENT DOCUMENTS

| | | | |
|---|---|---|---|
| 2005/0275367 A1* | 12/2005 | Buehler | B25J 9/102 318/568.12 |
| 2011/0180333 A1* | 7/2011 | Niederberger | B08B 1/00 180/8.6 |
| 2012/0151706 A1* | 6/2012 | Seo | A47L 1/03 15/319 |
| 2012/0181096 A1 | 7/2012 | Niederberger | |
| 2012/0187752 A1* | 7/2012 | Niederberger | B62D 57/024 305/165 |
| 2013/0186699 A1* | 7/2013 | Prahlad | B62D 57/024 180/55 |
| 2013/0226341 A1* | 8/2013 | Sturm | B25J 5/007 700/245 |
| 2014/0216836 A1* | 8/2014 | Davies | B62D 55/06 180/164 |

FOREIGN PATENT DOCUMENTS

| | | |
|---|---|---|
| EP | 1924487 | 7/2009 |
| WO | WO2013/048263 | 4/2013 |

OTHER PUBLICATIONS

Shen et al. (2006). Permanent magnetic system design for the wall-climbing robot. Applied Bionics and Biomechanics, 3(3), 151-159.

Ward et al., 'Design of a High Capacity Electro Permanent Magnetic Adhesion for Climbing Robots', Proceedings of the 2012 IEEE International Conference on Robotics and Biomimetics, Dec. 11-14, 2012, pp. 217-222.

Chu et al., A Survey of Climbing Robots; Locomotion and Adhesion, International Journal of Precision Engineering and Manufacturing, Aug. 2010, vol. 11, No. 4, pp. 633-647.

International Search Report (PCT/AU2014/000719).

Written Opinion (PCT/AU2014/00719).

* cited by examiner

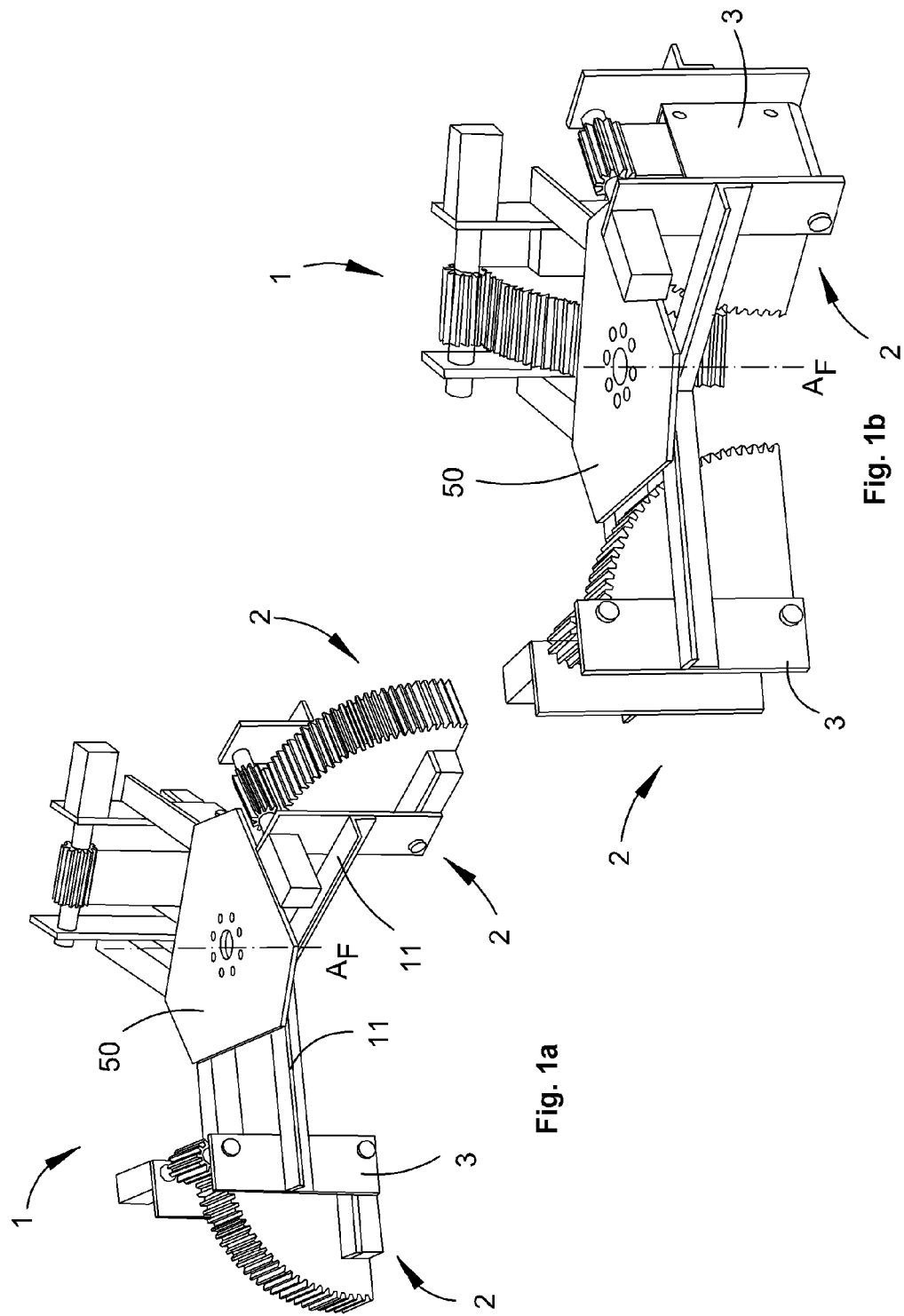

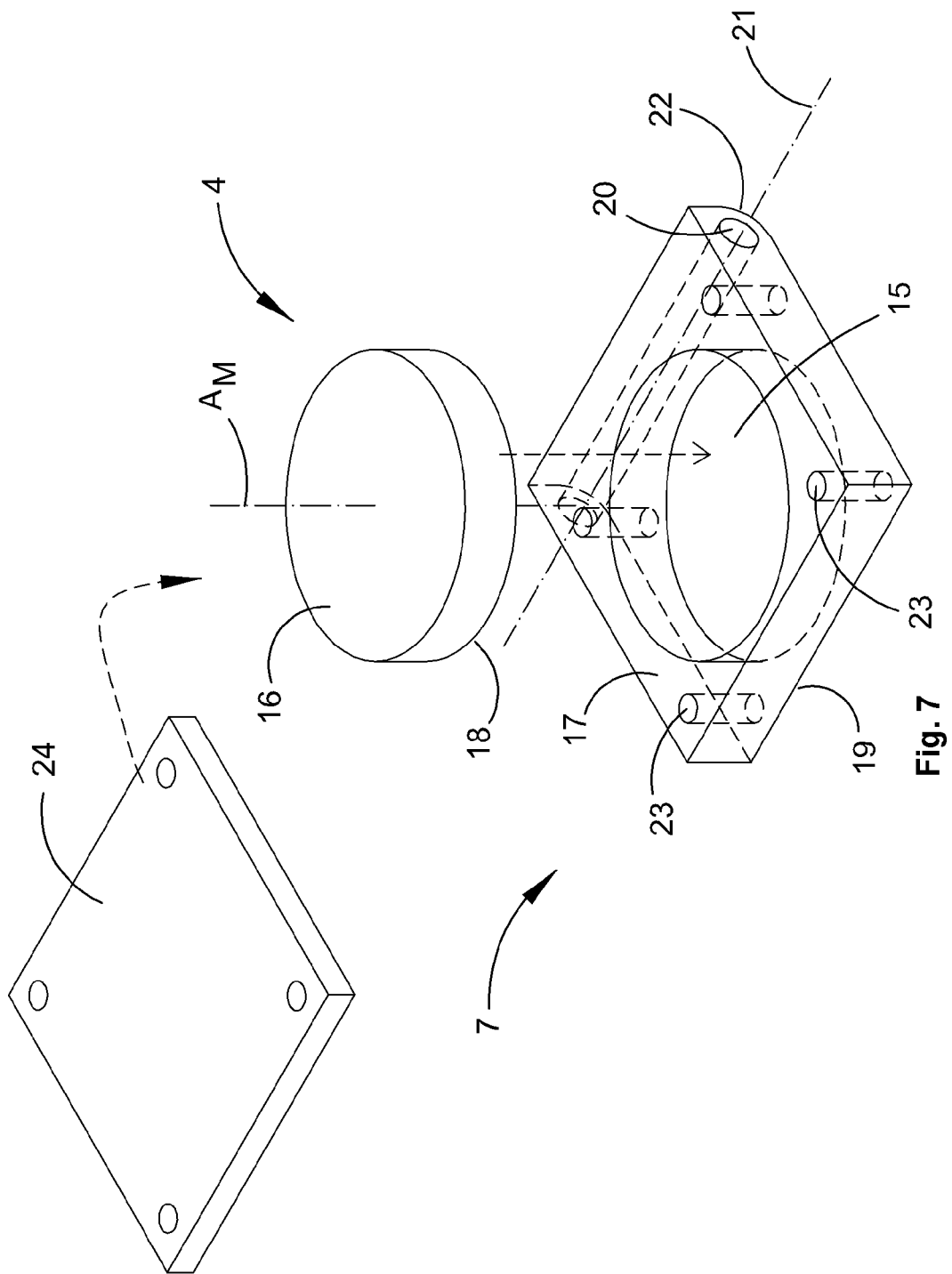

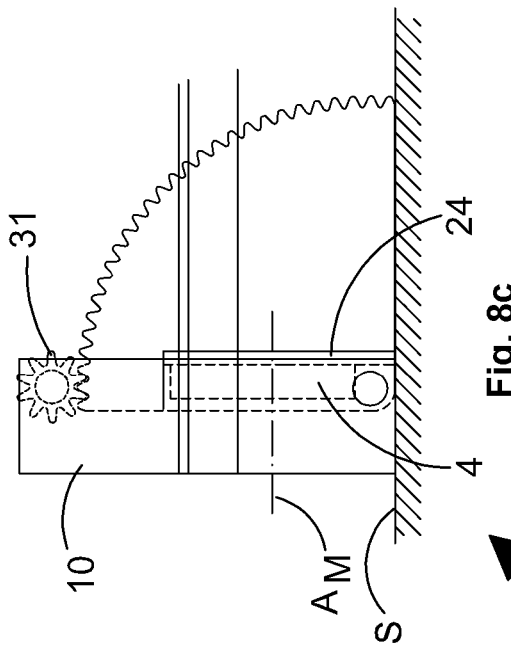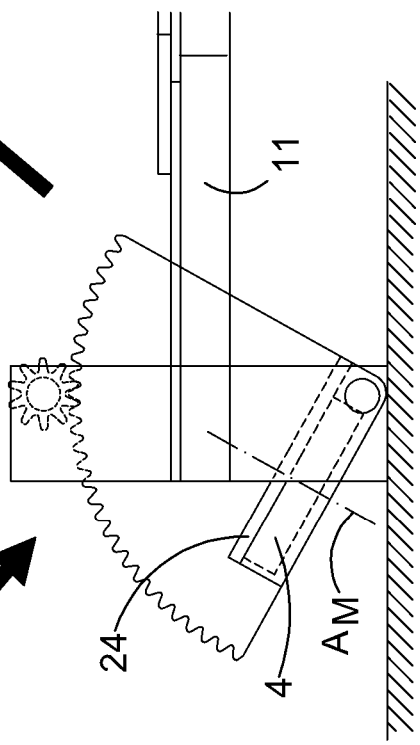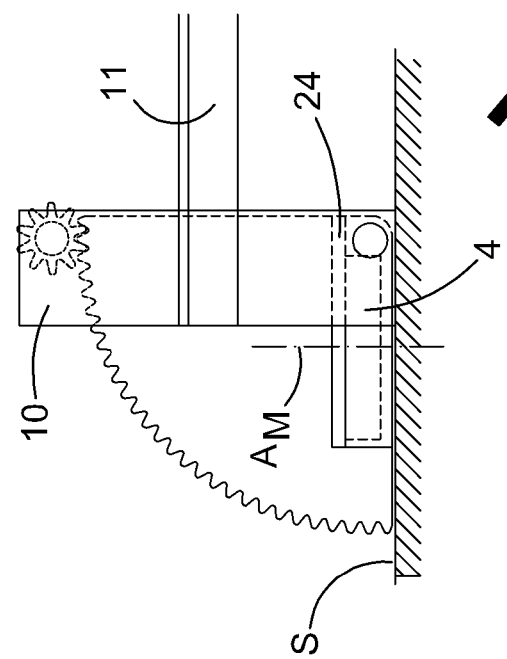

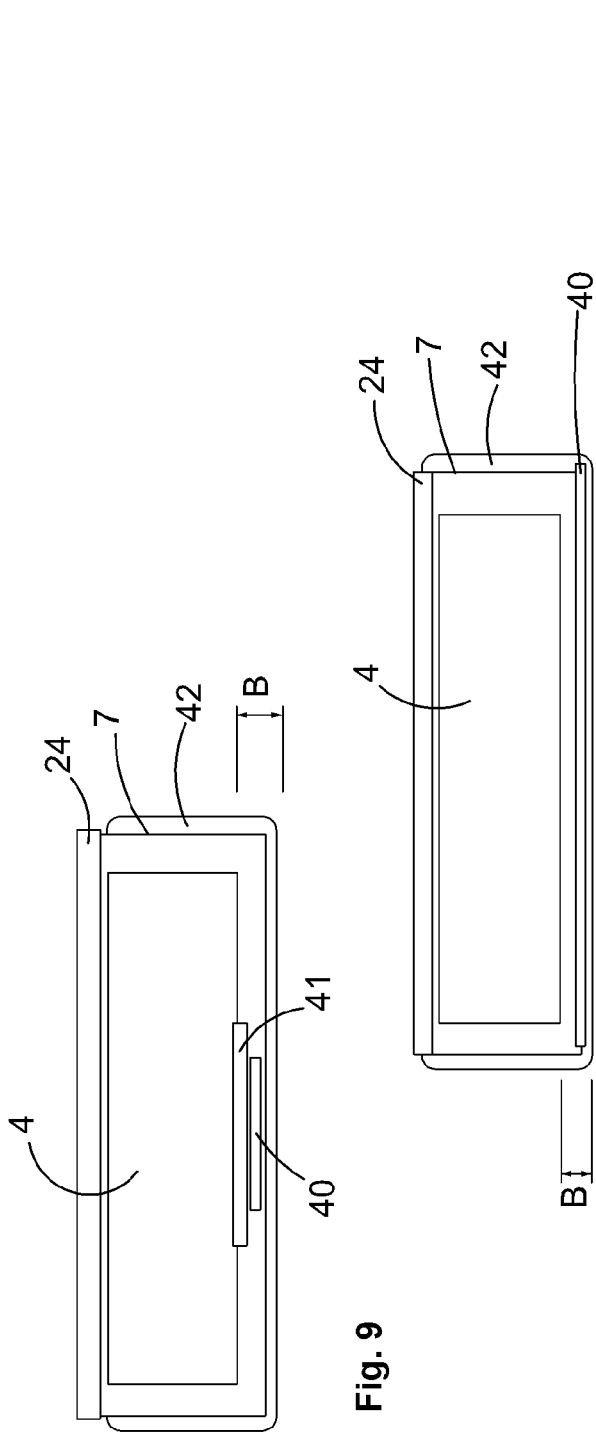

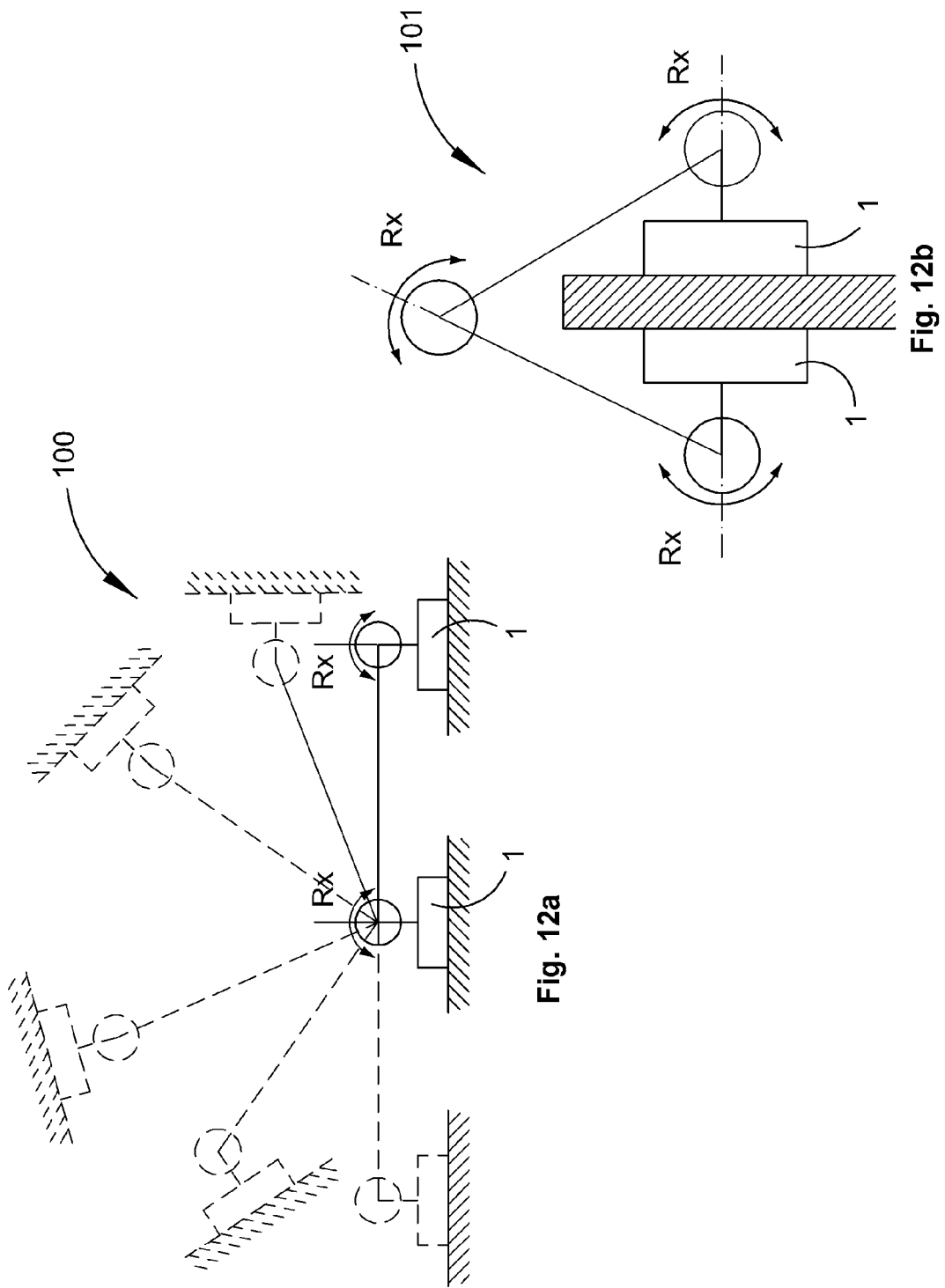

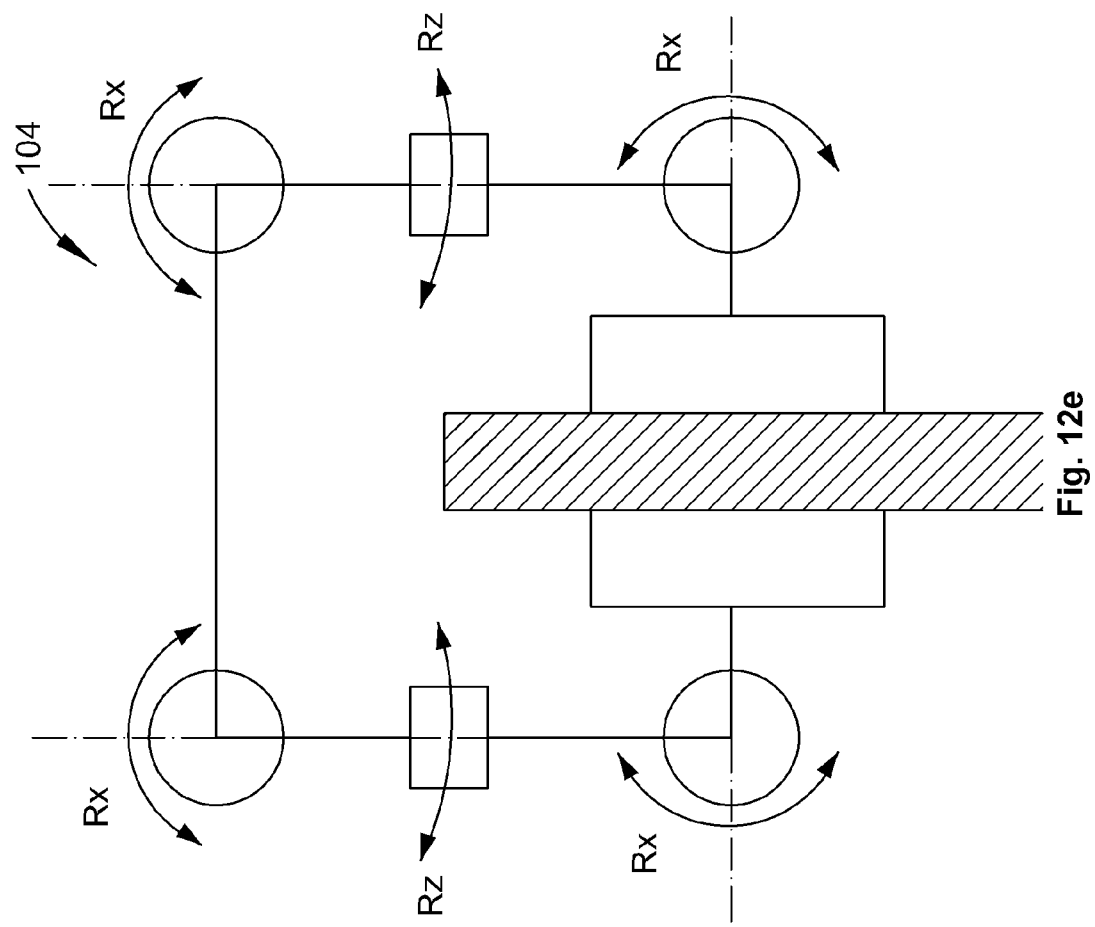

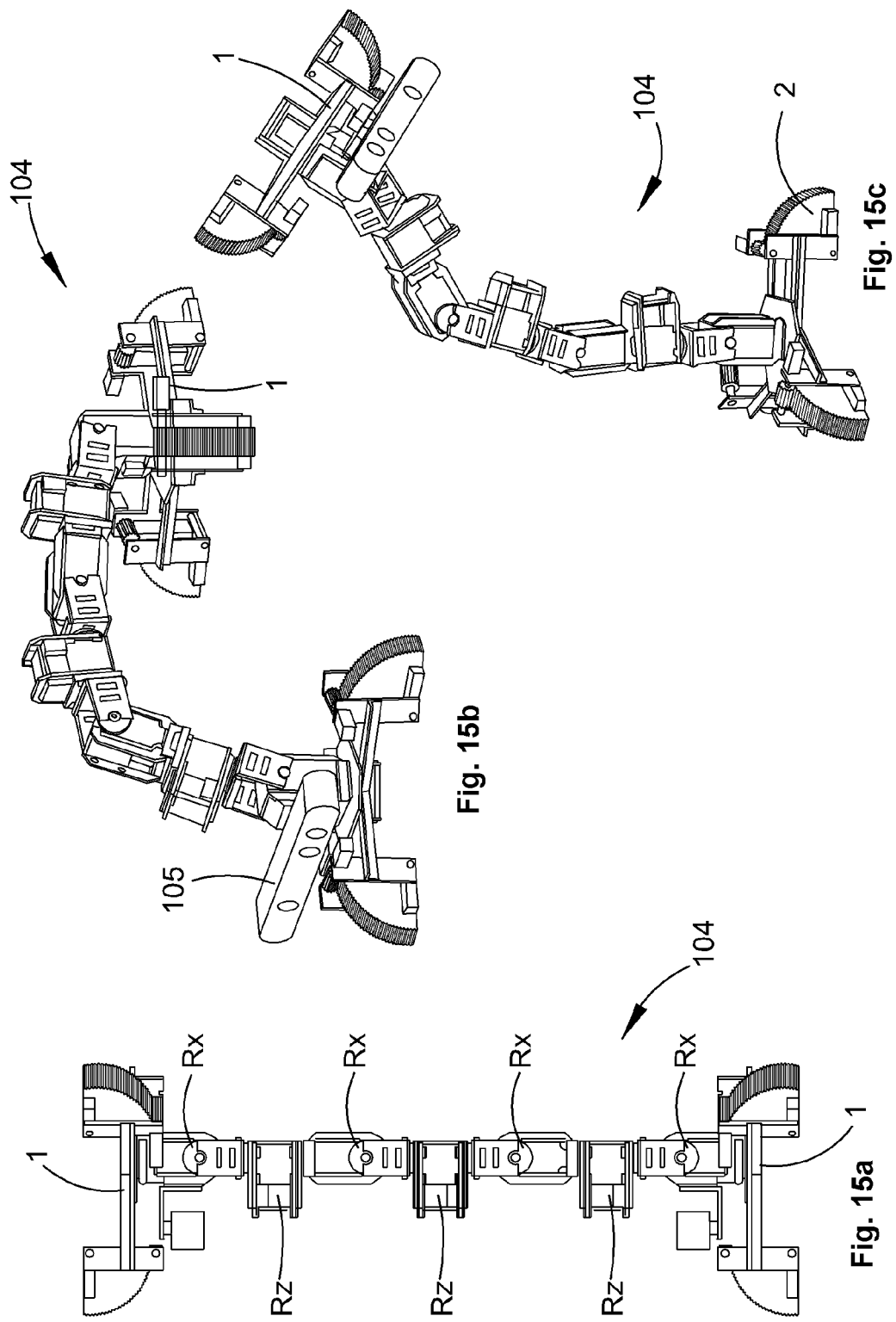

ADHESION SYSTEM FOR A CLIMBING VEHICLE

CROSS REFERENCE TO RELATED APPLICATIONS

This is the U.S. National Stage of International Application No. PCT/AU2014/000719, filed Jul. 14, 2014, which was published in English under PCT Article 21(2), which in turn claims the benefit of Australian Application No. 2013902595, filed Jul. 12, 2013. The Australian application is incorporated herein ire its entirety.

FIELD OF THE INVENTION

The present invention relates generally to climbing vehicles and robots and more particularly to the configuration of high mobility climbing robots and adhesion systems for such robots.

The invention has been developed primarily for an autonomous inspection robot to inspect structures such as bridges, buildings, trusses and frameworks where manual inspection is difficult or unfeasible due to safety and/or access considerations. Such applications require a high degree of mobility for operation in complex, potentially discontinuous structures, compactness for operating in confined spaces, and autonomy and reliability because access for control and recovery may be difficult or not practical. Such a robot must be able to navigate the structure without use of ancillary equipment such as rails, tracks, wires or supports.

However, while the invention is described with particular reference to climbing robots and magnetic adhesion, the adhesion system may also be applied to other types of robot, vehicles and payload carrying or supporting machinery. Similarly the robot configuration may be implemented with other types of surface engaging adhesion systems.

BACKGROUND OF THE INVENTION

The following discussion of the prior art is intended to facilitate an understanding of the invention and to enable the advantages of it to be more fully understood. It should be appreciated, however, that any reference to prior art throughout the specification should not be construed as an express or implied admission that such prior art is widely known or forms part of common general knowledge in the field.

The most significant problems in designing climbing robots relate to balancing the robot weight with mobility and the adhesion system. All of these design problems interrelate and all are heavily dependent on the robot's operational requirements and intended environment.

One class of climbing robot uses wheels for mobility and an adhesion system to hold the wheels in contact with the climbing surface. While wheeled robots require low control complexity and can achieve high climbing speeds, they typically lack capability dealing with uneven surface. As with non-climbing vehicles, most wheeled robots are unable to cope with complex plane transitions, and the ability to span discontinuous surfaces. The problems are only exacerbated for climbing robots dealing with complex transitions and overcoming gravity. To overcome gravity, wheels with active adhesion, such as magnetic adhesion, are required. Wheels incorporating magnetic adhesion will accumulate ferromagnetic dust which eventually leads to failure in adhesion and jamming.

On the other hand, legged robots tend to be a slower form of locomotion, although they can overcome many of the problems faced by wheeled and tracked locomotion because by sitting further from the surface they typically have the ability to step over obstacles or transition to other planes. However, this also results in a significant shortcoming in that with the increased spacing from the surface, the lateral detachment moment increases for a given body weight. Furthermore, in order to support the weight of the robot actuators used for joints must be stronger than those used for wheel and tracked locomotion. Accordingly legged robots typically require improved adhesion systems.

To date, no acceptable solution has been identified for balancing weight with the required mobility to traverse complex surfaces.

It is an object of the present invention to overcome or substantially ameliorate one or more of the deficiencies of the prior art, or at least to provide a useful alternative.

SUMMARY OF THE INVENTION

Accordingly, in a first aspect the invention provides a foot for a climbing vehicle or robot, said foot providing selective anchoring to a surface of a structure and including a surface contacting toe assembly having an adhesion system transitionable between an engageable state, wherein the adhesion system is configured to actively hold the toe to the surface on a plane of engagement thereby anchoring the foot to the structure, and an disengageable state to allow detachment of the foot from the surface;

wherein the adhesion system includes a magnetic adhesion module having a magnetic field generator for projecting a magnetic field outwardly from the plane of engagement toward the engaged surface when the adhesion system is in the engageable state, to thereby generate a magnetic attractive force between the module and a magnetic target material within or beneath the surface of the structure.

Preferably, the magnitude of the magnetic attractive force between the module and the ferromagnetic material is substantially greater in the engageable state than in the disengageable state, thereby enabling selective magnetic adhesion of the adhesion system with the target material. More preferably the magnitude of the magnetic attractive force between the module and the target material is substantially zero in the disengageable state.

Preferably, the magnetic adhesion module includes switching means for modifying the magnetic field such that when the adhesion system is in the engageable state, the net magnetic fieldat the surface is greater than when the adhesion system is in the disengageable state.

The magnetic field generator may include one or more of: an electro magnet, an electro-permanent magnet; a permanent magnet.

Preferably, the magnetic field generator includes a permanent magnet having a magnetic axis and the switching means includes an actuator for physically moving the permanent magnet between a first position corresponding to the engageable state and second position corresponding to the disengageable state. Alternatively, the switching means may be enabled by electro-magnetic modification of the magnetic field.

The permanent magnet may include any one or more of: a Halbach array magnet; same-polarity array magnet; alternating-polarity array magnet; rectangular mounting magnet; disk magnet and/or a disk mounting magnet. However preferably, the permanent magnet is a disk magnet having first and second generally parallel, opposing disk faces generally normal to the magnetic axis Preferably, the magnetic axis is orientated generally normal to the surface when the adhesion module is in the first position thereby maximising the magnet field projected toward the surface.

Preferably, the magnet is retained within a housing, the housing hingedly mounted on the toe assembly about a peel axis for peelable transition between the first and second positions.

Preferably, the toe includes a frame attached to the foot and a magnet housing for retaining the magnet, the housing being hingedly mounted to the frame for rotation around the peel axis, between the first and second positions.

Preferably, the magnet housing is formed of a non-ferrous material and more preferably the housing is formed of a plastic material for instance, polyoxymethylene. Preferably, the adhesion module housing includes ferrous metal backing plate for modifying the magnetic flux field.

Preferably, the housing includes a surface engaging contact pad for contact with the engaged surface.

The actuator may include a linear actuator however preferably is a rotary actuator in the form of an electric motor driving a pinion gear, in turn driving a rack gear.

Preferably, the rack gear is a quadrant gear mounted to the housing, the quadrant having a centre aligned with the peel axis.

Preferably, the peel axis is disposed at or adjacent a peripheral edge of the permanent magnet and the magnetic axis is rotated around 90° between first and second positions.

Preferably, the magnet is presented in close proximity to the surface in the first position and comparatively withdrawn from the surface in the second position.

Preferably, the magnet is spaced from an engaged surface when in the first position by a separation distance of no more than 2.5 mm and preferably no more than 2 mm and more preferably no more than 1 mm. Most preferably the magnet is configured to be as close as possible or touching the surface when in the first position.

Preferably, the toe includes a sensor for monitoring the adhesion force. More preferably, the magnetic adhesion sensor includes a force-sensitive resistor.

Preferably, the force-sensitive resistor is mounted under the magnet.

Preferably, the sensor includes a hall effect sensor and/or a piezo electric force sensor.

Preferably, the toe includes a contact sensor for monitoring contact of the toe with a surface.

Preferably, the sensor is a proximity sensor for sensing the proximity of a surface.

In a second aspect the invention provides a foot for selective anchoring to a surface of a structure, the foot including a surface contacting toe assembly having an adhesion system transitionable between an engageable state wherein the adhesion system is configured to actively hold the toe to the surface on a plane of engagement thereby anchoring the foot to the structure and a disengageable state to allow detachment of the foot from the surface.

Preferably, the adhesion system includes one or more of: chemical adhesion means; electrostatic adhesion means; mechanical adhesion means; magnetic adhesion means and pressure differential adhesion means.

In a third aspect the invention provides a foot as previously described including a plurality of surface contacting toe assemblies configured in a surface contacting array.

Preferably, the foot includes a foot body and a central foot axis, the plurality of surface contacting toe assemblies configured in a generally planar, circumferential array around a central foot axis.

Preferably, the surface contacting array is configured for contacting a curved surface.

Preferably, the array is an evenly spaced circumferential array.

Preferably, the foot has at least three toe assemblies arranged in a tripod configuration.

In a fourth aspect the invention provides a surface anchoring vehicle or robot having at least one foot as described above, preferably two or more feet and preferably two feet.

Preferably, the vehicle is a climbing robot and more preferably an inchworm type vehicle including an elongate jointed body having a pair of opposite distal ends and a surface anchoring foot attached at or adjacent each distal end.

Preferably, the robot includes at least two joints providing the body with at least two degrees of freedom of movement. More preferably, the robot includes seven joints providing the body with seven degrees of freedom of movement.

Preferably, each degree for freedom is provided by a rotation joints having a single axis of rotation.

More preferably, the vehicle includes four lateral rotations joints each having an axis of rotation lateral to the elongate body and three longitudinal rotations joints each having an axis of rotation aligned with the elongate body.

Preferably, each foot includes sensing means for providing data indicative of adhesion force with an engaged surface.

Preferably, each foot includes a cover to prevent the accumulation of ferromagnetic dust on the magnetic field generator and/or gear train.

Preferably, the cover is configured such that the magnetic field generator is adjacent the cover when in the first position and spaced from the cover whilst in second position.

In a fifth aspect the invention provides a surface anchoring vehicle or robot having at least one surface anchoring foot for selective anchoring to a surface of a structure, the foot including a surface contacting toe assembly having an adhesion system transitionable between an engageable state wherein the adhesion system is configured to actively generate an adhesive force with the surface thereby anchoring the foot to the structure and a disengageable state to allow detachment of the foot from the surface, the toe being equipped with sensing means operatively connected to the control system, the sensing means for measuring the adhesion force generated with the engaged surface to determine anchor load limit parameters.

Preferably, the control system compares anchor load limit parameters against calculated operational load parameters prior to operational loading of the foot.

Preferably, the control system modifies operation of the robot to ensure load limit parameters are not exceeded during operational loading.

In another aspect the invention provides a control system for a surface anchoring robot the robot having at least one surface anchoring foot for selective anchoring to a surface of a structure, the foot including a surface contacting toe assembly having an adhesion system transitionable between an engageable state wherein the adhesion system is configured to actively generate an adhesive force with the surface thereby anchoring the foot to the structure and a disengageable state to allow detachment of the foot from the surface, the toe being equipped with sensing means operatively connected to the control system, the sensing means for measuring the adhesion force generated with the engaged surface to determine anchor load limit parameters.

Preferably, the control system compares anchor load limit parameters against calculated operational load parameters prior to operational loading of the foot.

Preferably the control system modifies operation of the robot to ensure the load limit parameters are not exceeded during operational loading, thereby to prevent inadvertent detachment during normal operation. In one embodiment, data from the sensing means indicative of the adhesion force generated with the engaged surface is a control input to a feedback loop forming part of the control system, whereby the control system continuously or intermittently determines the maximum adhesion forces available with respect to the engaged surface, and constrains or modifies movement parameters of the robot on the basis of a control algorithm, to prevent generation of forces that would cause the maximum adhesion forces to be exceeded. Preferably, this aspect of the control system is functionally integrated with an autonomous route planning system for the robot.

Unless the context clearly requires otherwise, throughout the description and the claims, the words "comprise", "comprising", and the like are intended to be construed in an inclusive sense as opposed to an exclusive or exhaustive sense; that is to say, in the sense of "including, but not limited to".

BRIEF DESCRIPTION OF THE DRAWINGS

Preferred embodiments of the invention will now be described, by way of example only, with reference to the accompanying drawings in which:

FIG. 1a is a schematic perspective view of an adhesive foot mechanism in accordance with the invention, illustrated in the engageable state;

FIG. 1b is a schematic perspective view of the adhesive foot shown in FIG. 1a, illustrated in the disengageable state;

FIG. 4 is a detailed schematic perspective view of a surface contacting toe assembly in accordance with the foot shown in FIG. 1a;

FIG. 7 is a detailed exploded schematic perspective view of a magnet housing in accordance with the invention;

FIGS. 8a to 8c are schematic side views illustrating stages of a detachment process in accordance with the invention;

FIGS. 9, 10 and 11 are schematic sectional side views of a magnet housing illustrating various sensor configurations;

FIG. 12a is a schematic side view illustrating an inchworm robot in accordance with the invention configured for maximising mobility with 2DOF;

FIG. 12b is a schematic side view illustrating an inchworm robot in accordance with the invention having the minimum DOF for a 360° plane transition;

FIG. 12e is a schematic side view illustrating an inchworm robot in accordance with the invention having hyperredundant 7DOF providing for high robustness in performing complex 3D plane transitions;

FIGS. 15a to 15c are illustrations of an inchworm magnetic adhesion robot in accordance with the invention in various configurations;

FIG. 16c is a schematic perspective view of an adhesive foot mechanism in accordance with the invention utilising three adhesives toes illustrated in FIG. 16a.

PREFERRED EMBODIMENTS OF THE INVENTION

Figure 3:
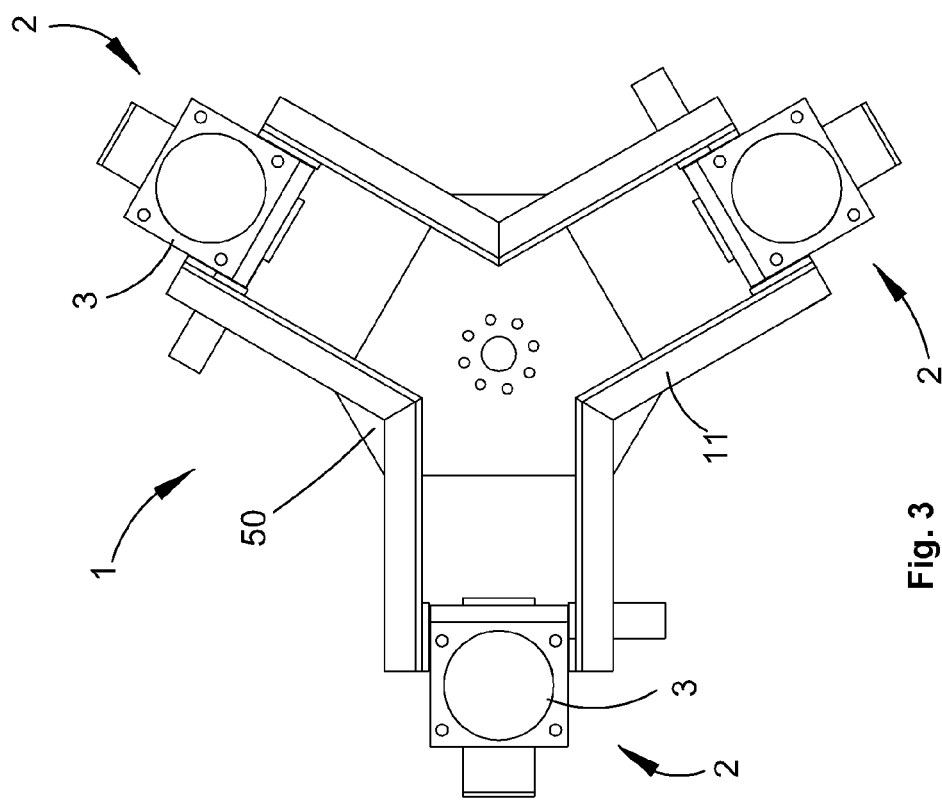
FIG. 3 is a bottom view of the adhesive foot shown in FIG. 2.

Referring to FIG. 1, the invention provides a foot 1 for selective anchoring to a surface of a structure. The foot 1 includes at least one surface contacting toe assembly 2 having an adhesion system to actively hold the toe against the surface, thereby anchoring the foot to the structure.

The terms "active adhesion" and "actively hold" refer to the adhesion system providing a positive adhesive or attractive force, independent of gravitational forces, between the foot and the surface.

By "selective" it is meant that the foot may be readily engaged to and disengaged from the surface as required. Accordingly, the adhesion system is transitionable between an engageable state providing active adhesion to the surface and a disengageable state to allow detachment of the foot from the surface.

The surface may be defined by a bare substrate, or by one or more layers overlaying a base structure or substrate on which the foot is operating. Unless specifically stated, or clearly intended otherwise, use of the term "surface" herein refers to the target surface against which the toe is held by the adhesion system irrespective of the mode of adhesion.

The foot 1 may be used for anchoring any type of vehicle or support requiring selective, active adhesion to a surface. However in this preferred embodiment, the foot will be described with reference to a climbing autonomous vehicle or robot. In this application, it will be appreciated that in order to allow the vehicle to climb and traverse inclined, vertical and/or inverted surfaces, the foot must provide an active adhesive force greater than the detachment forces acting through the foot resulting from the combined weight force of the vehicle and any payload carried by the vehicle (adjusted for the number of feet). Since detachment forces are directly proportional to the mass of the vehicle, clearly there is an incentive to reduce the mass of the vehicle, including the mass of the adhesion system, while increasing available adhesive force.

In a first form, the adhesion system provides a boundary surface interaction mode whereby the adhesion system interacts with the outermost boundary layer of the surface to generate the adhesive holding force. The surface may be defined by the surface of a substrate or the outermost surface of one or more layers overlying a base or substrate. An example of a boundary surface adhesion system would be a pressure differential or vacuum based adhesion system.

In a second form, the adhesion system interacts with a reactive target material to generate the adhesive holding force. The target material may form the surface boundary, or form or be distributed within a base substrate and/or within a layer beneath the surface boundary. In this second form, one or more un-reactive layers may be interposed between the outermost boundary surface and the reactive material, thus the adhesive force may be generated without direct contact between the adhesion system and the reactive material. An example of such an adhesion system is magnetic adhesion, which may operate by interaction with a substrate, through an outer surface coating that is non-magnetic, such as a layer of surface protection or corrosion (eg paint or rust).

Each form of adhesion system may provide many advantages. However, it is ultimately the disadvantages that will prove the adhesion system infeasible for particular applications. For instance, boundary surface interacting adhesion systems have a distinct disadvantage in that they generally require a surface layer with structural integrity sufficient to support adhesion forces. With significant build up of paint, dirt and rust, all methods that adhere to the exterior surface may lead to unintended detachment from the structure by breakdown of the top surface layer from the structure (powdering, peeling etc) surface irregularities may also prevent effective adhesion.

On the other hand, adhesion systems that interact with a target material forming part of, or underlying the surface, are often negatively affected with increasing separation from the target material. Non-reactive layers over the reactive target material can negatively affect adhesion forces because they increase the separation distance between the adhesion system and the target material. Moreover, adhesion systems of this type can only be used with surfaces and structures which include sufficient amounts of reactive target material, such as ferrous metals, to generate the requisite adhesive force.

Bearing this in mind, the adhesion system is selected after careful consideration of the intended environment and design requirements. Suitable forms of adhesion systems, depending on the environment, include but are not limited to one or more of: magnetic adhesion means; chemical adhesion means; electrostatic adhesion means; mechanical adhesion means; and pressure differential or vacuum adhesion.

Magnetic Adhesion System

Magnetic adhesion systems require the generation of a magnetic field by a magnetic field generator and the presence of a magnetic material in the target surface. Magnetic adhesion is generally the most reliable form of adhesion that can be adopted when a reliable ferromagnetic surface is available, particularly if the outer surface of the structure has irregularities or inconsistent properties.

Figure 4:
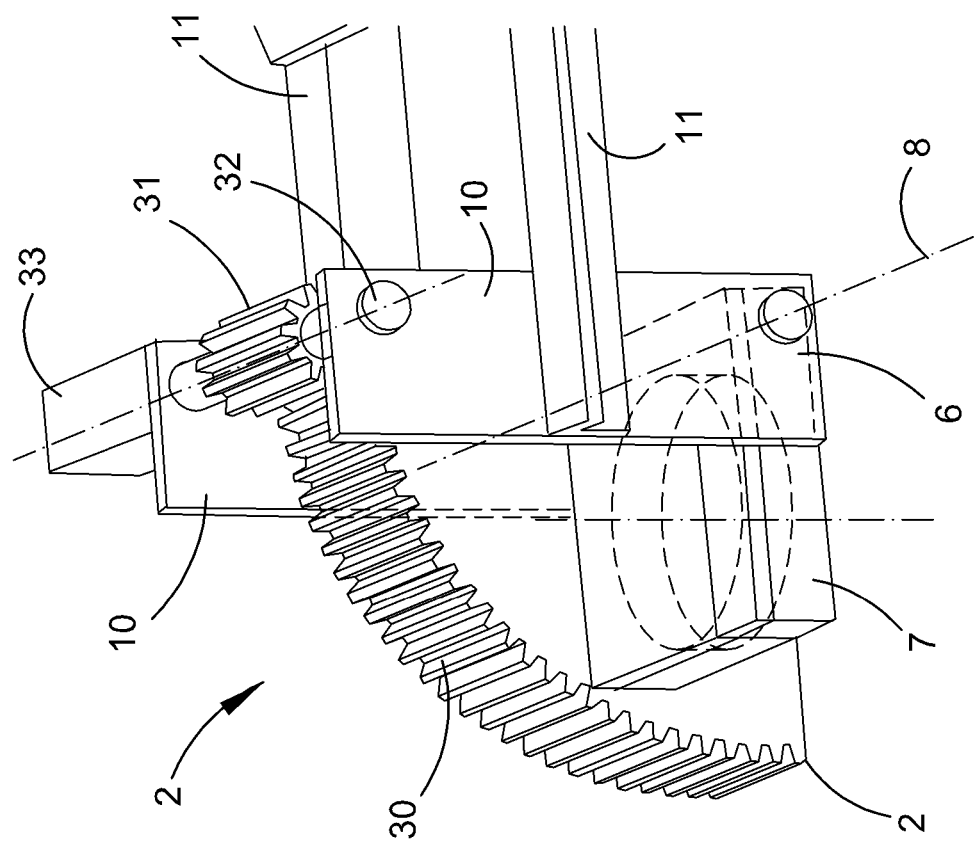

A detailed view of the toe assembly 2 is shown in FIG. 4. In this embodiment, which is designed for use on steel structures, the toe 2 includes a magnetic adhesion module 3 to provide an active magnetic adhesion force between the module and the steel structure. In this application the steel structure itself forms the target ferromagnetic material. However, the ferromagnetic target material may also form or be distributed within the supporting substrate or a layer over, within or behind the supporting substrate.

The magnetic adhesion module 3 includes a magnetic field generator 4 for projecting a magnetic field outwardly toward the engaged surface to interact with the magnetic target material. In the general case, the pull force for a magnetic field generator is strongly related to the residual magnetic flux density, the magnetic pole area and also the magnetic moment vector. However, arguably the most significant variable observed with magnetic solutions pertains to the exponential decrease of force with increasing separation from the magnetic target material, which is a fundamental characteristic of magnetism.

The most suitable magnet types and configurations will have the smallest size and weight, with the greatest adhesion performance over a predetermined separation range. However, while the weight and volume for different magnetic configurations may be the same, each different configuration will exhibit unique magnetic field properties including the field density at the pole, the area of the pole and the shape of the field. Accordingly, changes in the magnet configuration will have direct changes in the magnetic field path, yielding advantages and disadvantages depending on the intended application. For example, a particular magnetic configuration may increase the pull force at the cost of the field decaying much faster with increased separation displacement; the opposite may also be true.

In light of the above, it is important to consider the separation parameters which may be encountered in the intended application. In the case of steel structures, it is often the case that a non reactive surface layer prevents direct access to the ferromagnetic material. The layer may be intentionally applied, in the case of protective paints and coverings, or exist unintentionally, for instance surface oxidisation and debris accumulation. Either way the non-reactive surface layer acts to increase separation between the magnetic adhesion module and the reactive ferromagnetic material, thereby reducing the magnetic adhesive force.

Figure 5:
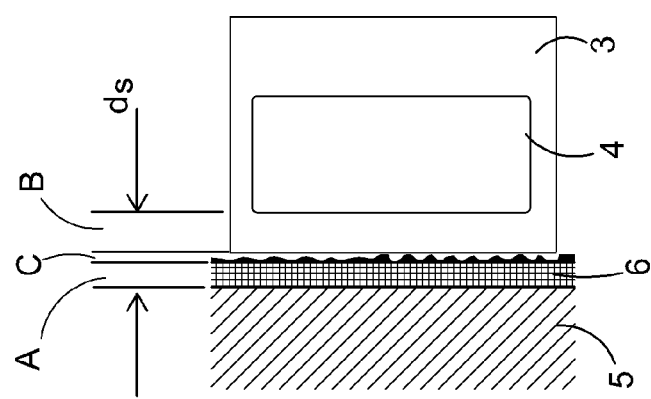
FIG. 5 is a schematic side sectional view displaying separation between a magnetic flux generator and a target surface.

Generally, separation distance between the magnet and the target ferromagnetic material for a magnetic adhesion module may include three parts, schematically illustrated in FIG. 5. Magnetic adhesion module 3 includes a magnetic field generator 4. The total separation distance $d_s$ is due to: A) submersion of the target reactive ferromagnetic material 5 beneath the accessible surface—generally due to non reactive surface layers 6; B) a separation inherent in the design of the magnetic adhesion module; and C) the gap between the module and the surface generally caused by surface roughness and/or irregularities.

Magnetic field generators can be generally divided into electro-magnetic and permanent magnetic field generators. Electro-magnetic field generators rely on the property whereby an electric current generates a magnetic field. Thus with the notable exception of super conducting technology, electromagnets require continuous power by way of a voltage gradient to generate current and in turn induce a magnetic field. One advantage of electromagnetic field generators is that the magnetic field can be controlled by controlling the current with electronic circuits. However, a significant disadvantage is that power failure will result in loss of magnetic field, consequential loss of adhesive force and potential inadvertent detachment from the surface.

Conversely, permanent magnets inherently generate a magnetic field and are not dependant on external power sources. However, whilst permanent magnetic solutions do not require continuous power, work must be done to move the magnet from the attached state to the detached state, generally requiring some form of power. Thus, in the event of a power failure, permanent magnet based magnetic adhesion systems may remain affixed to the target surface.

The required fail-safe behaviour in the event of power loss may influence the selection of electro-magnets or permanent magnets. In this embodiment, however, the use of a permanent magnet provides fail-safe operation in the event of a power outage or system failure. Permanent magnet systems also have little to no power consumption and a relatively low mass for the strength of the magnetic field generated.

Suitable permanent magnets configurations include any one or more of: a Halbach array magnet; same-polarity array magnet; alternating-polarity array magnet; rectangular magnet; and/or disk magnet.

It should also be noted that the performance characteristics of magnets may be altered by use of various magnetic housings, shrouds, covers, keepers and backing plates. For instance a common magnetic configuration is seen in holding magnets which use a ferro-magnetic housing (for instance a steel housing) around the magnet. The steel housing may be configured to alter the magnetic field to increase the magnetic force for the same magnet volume. However, a side effect is that the magnetic field decays very fast with increased separation. To reduce this effect the housing can be replaced with a steel back plate. This configuration is shown to yield both a comparably high adhesion force while maintaining a greater effective magnetic field range.

In other embodiments the permanent magnet may be replaced with or supplemented by an electro-magnet. In still further embodiments, the magnetic field generator includes an electro-permanent magnet.

Adhesion Control and Switching

The magnetic adhesion module includes switching means for modifying the magnetic field of the magnetic field generator such that when the adhesion system is in the engageable state, a net active attractive force generated by the magnetic adhesion module and the target material to actively hold the toe to the surface. When the adhesion system is in the disengageable state, the magnetic attractive force generated by the magnetic adhesion module is substantially reduced to allow detachment from the surface.

In general terms, the switching means alters the properties of the magnetic field projected toward the target surface such that in the engageable state, the density of the field reaching the surface is comparatively greater than in the disengageable state. The change in field density experienced by the target surface provides a corresponding change in the magnetic adhesion force between the module and the ferromagnetic target material. High adhesive forces correspond to the engageable state whereby the toe of the foot is actively held to the surface thereby anchoring the foot to the surface. Comparatively low or no magnetic adhesive forces correspond to the disengageable state to allow detachment of the foot from the surface.

Modification of the magnetic field can be achieved by directly modifying the magnetic field generator or by indirect modification of the magnetic field. Direct modification includes for example, altering the current of an electro-magnet, or by physically moving a magnet to a different position with respect to the target surface. Indirect modification includes using a second magnet (either a permanent magnet or electro-magnet) or a magnetic diverter to alter the magnetic field shape or density projected to the target surface.

In the case of an electro-magnetic modification, the switching means comprises associated electronic current control circuitry to control the magnetic field inducing current. Physical movement generally requires the switching means to include an actuator for physically moving a component to modify the magnetic field.

In the embodiment illustrated, the switching means includes an actuator for moving the permanent magnet between a first position corresponding to the attachable state and a second position corresponding to the detachable state. Since either displacement or orientation of the magnet from the target magnetic material will determine the density of the magnetic flux reaching the target material, one or both may be altered between the first and second positions.

Either way, the orientation and/or separation of the magnet in relation to the target surface, when in the first position, are selected to maximise the magnetic interaction and corresponding adhesive force. Normally this is achieved by minimising the magnet/surface separation and orientating the magnet to maximise the area of a magnetic pole presented to the target surface. The later generally requires aligning the magnetic axis of the magnet to be normal to the target surface. However, this will depend on the configuration of the magnet.

Conversely, when in the second position, orientation and/or separation are selected to minimise the magnetic interaction and resultant adhesive force with the target surface. This may be achieved by increasing the magnet/surface separation and/or orientating the magnet to minimise the area of a magnetic pole presented to the target surface.

It will be appreciated that physical movement between engaged and unengaged states requires application of a detachment force sufficient to overcome the adhesive forces of the attached state.

Figure 6:
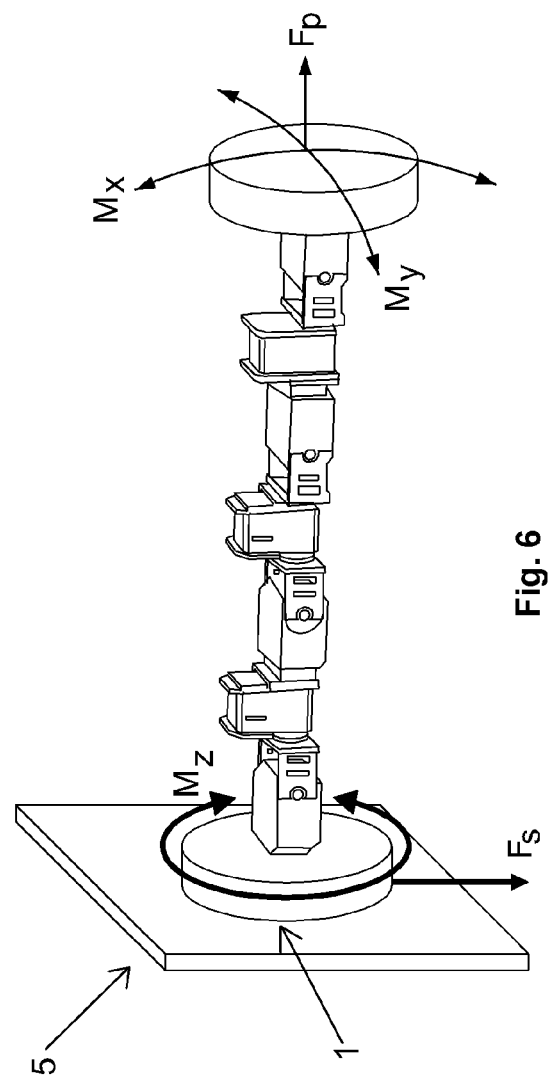
FIG. 6 is a schematic perspective view displaying forces corresponding to failure modes for an adhesive foot attached to a target surface.

FIG. 6 displays a schematic representation of the modes of failure for a magnetic adhesive force $F_m$ generated between a magnetic adhesive footpad 1 and a target surface 5. These include excessive pull force, $F_p$, slip force, $F_s$, bending moment in the x-direction, $M_x$, bending moment in the y-direction, $M_y$, and torsion in the z-direction, $M_z$.

The most difficult method to remove a magnet from a surface is through lifting perpendicular to the surface $F_p$. Here the pull force required must be larger than the magnetic adhesive force $F_p > F_m$. However, the force required can be drastically reduced by applying mechanical advantage. It is assumed that the magnetic force $F_m = F_p$ is applied through the centre of a magnet with a radius Rm. The applied bending moment $M_{x,y}$ is maximised by using the edge of the magnet as the point of rotation, where the required bending moment $M_m$ is expressed by the equation:

$$M_{x,y} = R_m \times F_m$$

This mechanism for detachment in this mode is referred to as "peeling". A magnet that is peeled from the surface will follow the arc of a semicircle, with the centre of the arc being at the rotation axis for the magnet. This movement mechanism provides a first position where the magnet is presented with its magnetic axis $A_M$ generally normal to the surface, and the separation between the magnet and the surface is minimised. In the second position, the magnet is rotated approximately 90° so that its magnetic axis is parallel to the attachment surface. The rotational action both reorientates the magnetic poles and simultaneously withdraws the magnet from the surface thereby reducing the adhesive interaction of the magnetic field with the surface. Preferably the rotational axis is set as near to the peripheral edge of the magnet as possible to reduce the effective moment arm of the magnetic attachment force.

Of course other mechanisms for magnetic detachment may be used.

Magnetic Adhesion Module Construction

Returning to FIG. 4, a detailed view of a surface contacting toe 2 and magnetic adhesion module 3 for a surface engaging foot are shown in accordance with the invention.

The magnetic adhesion module uses a permanent disk magnet 4 to generate a magnetic field. As an example, the magnet specified for the illustrated module is a single disk DX44-N52 grade Neodymium rare earth permanent magnet, however other magnets could be used depending on design, size and operating parameters of the module. The magnet properties of the DX44-N52 magnet are listed in the table below.

| | |
|---|---|
| Magnet Type | DX44-N52 |
| Shape | Disc |
| Diameter (mm) | 31.75 |
| Thickness (mm) | 6.35 |
| Mass (g) | 37.7 |
| Material | NdFeB, Grade N52 |
| Plating | NiCuNi |
| Max op temp (° C.) | 80 |
| Magnetization Direction | Axial (Poles on Flat Ends) |
| Br max (Gauss) | 14,800 |
| BH max (MGOe) | 52 |

As indicated this magnet is axially magnetised such that the magnetic poles are located on the flat disc ends and the magnetic axis is generally parallel to the disc axis. The magnet provides greatest adhesive force with a magnetic target surface when orientated with the magnetic axis normal to the target surface and the displacement is minimised. In addition, the magnetic properties of the magnet may be enhanced, particularly within the 0-5 mm separation range, by placing a ferrous metal backing plate behind the magnet opposite the attachment surface.

Due to the shape of the magnetic field, magnetic attraction is comparatively substantially reduced at the lateral sides of the magnet.

Referring to FIG. 4, the adhesion module includes a light weight frame 6 mounted to the foot and a magnet housing 7 for retaining and protecting the magnet 4. The magnet housing 7 is hingedly attached to the frame about a peel axis 8 thereby allowing for rotational movement of the magnet between the first and second positions.

The frame 6 includes a pair of parallel frame plates or brackets 10 each individually attached to the foot on a respective arm 11.

The housing 7 is shown in greater detail in FIG. 7 and includes a magnet receiving cavity 15 for retaining the magnet 4 within the housing 7. As noted the disc magnet 4 is axially magnetised such that its magnetic axis $A_M$ is generally normal to axis of the disc. The cavity is shaped to correspond to the shape and size of the magnet such that when located in the cavity 15, the upper face 16 of the magnet sits flush with the top surface 17 of the housing and the bottom face 18 of the magnet is held no more than 2 mm from underside surface 19 of the housing, and preferably no more than 1 mm. Of course any achievable reduction in this distance is desirable. For instance in a preferred form the magnet is flush with the bottom surface of the housing.

A bore 20 is provided though the width of the housing to receive a hinge pin for hinge mounting about peel axis 21. The bore is positioned to pass close to a peripheral edge of the cavity such that rotation of the housing about the pin causes peelable movement of the magnet. The lower edge 22 of the housing adjacent the bore is rounded on the bore axis so as not to interfere with rotation during peeling.

The housing includes attachment formations in the form of holes 23 to allow the attachment of a ferrous metal backing plate 24. The backing plate not only seals and retains the magnet within the housing, it is also selected to enhance the magnetic field, redirecting it downwardly, toward the target surface.

Both the frame and housing are made from non-magnetic materials to reduce magnetic interaction. Both also must be lightweight and suitably strong to convey the magnetic adhesion forces generated by the magnet to the foot. In this embodiment the frame is made from aluminium, while the housing is polyoxymethylene (POM) or other suitable tough, plastics material.

The housing may include a layer of a resilient, and/or high friction material forming a contact pad on the underside surface. The pad provides a protective and/or cushioning interface between the housing and the target surface thereby preventing or reducing surface damage and marking to the housing and/or the target surface. A high coefficient of friction with the target surface aids in preventing slippage of the toe. The layer is tailored to the contact surface and preferably is configured for replaceable attachment. Possible materials for the layer include polyurethane and natural and synthetic rubbers. In this embodiment, the thickness of the pad is 0.5 mm. However it is preferable to minimise the thickness of the pad while maintaining function.

Returning to FIG. 4, actuation for the peeling mechanism is provided by a geared drive system including a quadrant bull gear 30 and pinion drive 31. Quadrant bull gear 30 is attached to the magnet housing 7 such that the centre of the bull gear is aligned with the pin and peel axis 8. Both the bull gear 30 and the pinion drive gear are made of lightweight, durable non ferromagnetic materials such as polyoxymethylene (POM) or bronze.

The bull gear and pinion drive provide a gear which along with the peelable leverage action, provides mechanical advantage to overcome the magnetic adhesion forces. In this embodiment the reduction ratio between the pinion and bull gear is 1:10 however other ratios and/or additional reduction gears may be used as required. In addition, appropriate gear teeth width and pitch are selected to distribute the high loading imparted during the peeling detachment process.

The pinion gear 31 is mounted between the frame brackets 10 on a pinion axel 32. A light weight rotary actuator 33 is connected to one end of the pinion axel and secured to one of the frame brackets. The rotary actuator includes a lightweight micro-metal electric gear motor and reduction gear set providing further gear reduction of ratio 1000:1. Depending on torque requirements, if necessary, a second motor can be connected to the pinion axel and configured to run cooperatively with the first.

Operation of the peeling mechanism is shown in FIGS. 8a, 8b and 8c. In the first position, shown in FIG. 8a, the magnet is presented with its magnetic axis $A_M$ generally normal to the attachment surface S, and the separation between the magnet and the surface is minimised. As noted, the magnet is a close as practically possible to the contact face of the contact pad representing the minimum separation from the target surface under ideal conditions where no surface layers are encountered. In FIG. 8b the magnet and magnetic adhesion module are shown in peeling transition between first and second positions.

FIG. 8c shows the magnet in the second position, rotated approximately 90° so that its magnetic axis $A_M$ is now generally parallel to the attachment surface. It will be appreciated that in this position, not only is the separation distance to the target surface S increased, the orientation of the magnet and distribution of the magnetic field results in the strongest magnetic field being projected generally parallel to the target surface where it generates substantially reduced attractive forces. This reduces the residual attractive force so that the module can be more easily detached from the target surface.

Figure 16A:
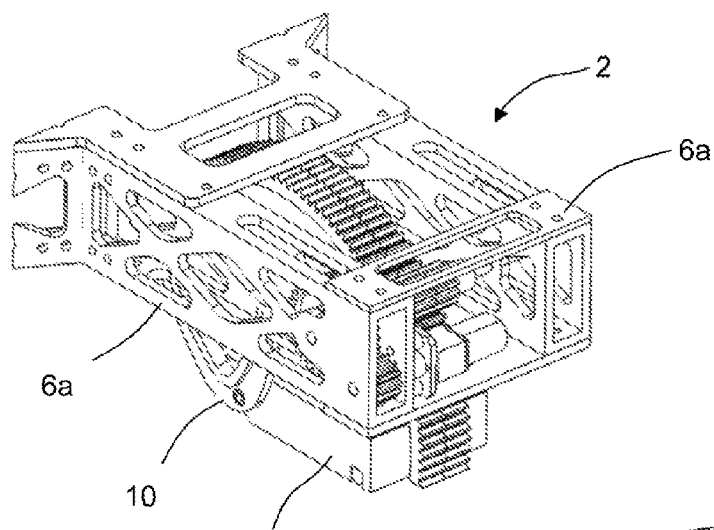
FIG. 16a is a schematic perspective view of an adhesive toe in accordance with another embodiment of invention.

An alternative design of magnetic adhesion module is shown in FIG. 16a. In this design, frame 6, and arm 11 are embodied as a truss formation 6a. The magnet housing 7 is pivotally attached to the truss by means of brackets 10.

Figure 16B:
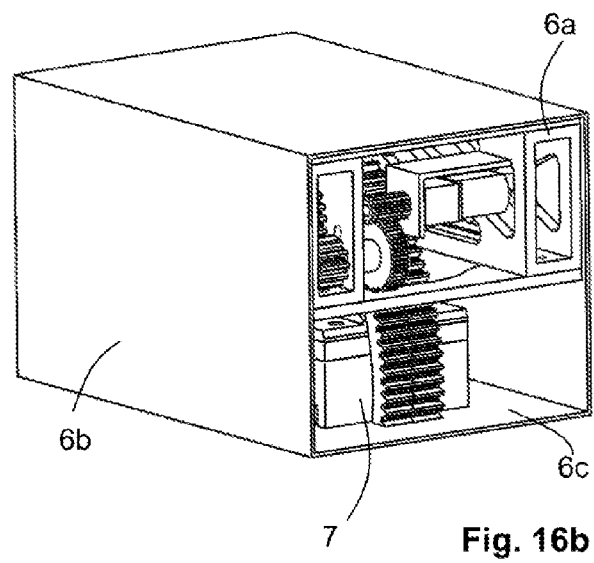
FIG. 16b is a schematic perspective view of the adhesive toe shown in FIG. 16a fitted with a protective cover.

As shown in FIG. 16b, this embodiment allows the fitment of a cover 6b to the frame 6a to shield the magnet and mechanical components from dust and debris encountered during operation. As we have seen, a significant feature of permanent magnets is that the magnetic field is permanent and cannot be easily annulled. While this has certain advantages, it also means that loose magnetic material and debris can accumulate on the exterior surface of the magnet and housing and be very difficult to dislodge. If left to accumulate, this material may compromise the attractive performance of the module.

As we have seen, one method of reducing the attractive force of a magnet is to increase the separation distance between the magnet and any magnetic material. Therefore while the cover not only provides a protective barrier to prevent ingress of debris into the peeling mechanism, by spacing the cover form the magnetic components, it also maintains a separation distance between any magnetic debris outside the cover and the magnet on the inside, thereby reducing the effective magnetic field reaching the debris and the attractive force that debris experiances.

Referring again to FIG. 16b, at the sides and the top of the module good separation can be achieved without excessively increasing the overall volume of the module. However as we have seen, to maximise the effectiveness of the module, it is important to minimise the separation distance $d_s$ (FIG. 5) between the magnet and the target magnetic material in the target structure. As such, at the surface engaging base of the module, so as not to interfere with the attractive force generated by the module, the cover is designed to minimise any increase in the separation distance when the magnet is in the first position. The cover base 6c is fixed to the module to be generally flush with the bottom of the magnet/magnet housing 7 when the housing is rotated into the first position as shown in FIG. 16b. Affixed in this way, the cover will be sandwiched between the magnet and magnet housing, and the surface of the engaged surface, when the module is engaged, increasing the separation only by the thickness of the cover.

While the cover provides minimal impact on the attractive force generated by the module, it will also provide little separation with any debris on the surface which may be attracted to the magnet. However with the cover fixed to the frame rather than the housing, as the magnet peels away from the surface and into the second position, it also withdraws from the cover. The associated magnetic field withdraws with the magnet thereby allowing magnetic dust and debris held back by the cover to detach.

It is also noted that because the magnet is "peeled" from the surface, rotating approximately 90 degrees from the first to second position, the non-uniform shape of the magnetic field projected out by the magnet may significantly assist in detachment of debris. As seen the magnet is orientated so that the position the magnet is configured so that the strongest magnetic field is projected outwardly toward the target surface. However in the second position, with reference to FIG. 8c, the magnetic field is projected parallel to surface S (or the base portion of the cover).

The cover may be comprised of one or more sections. For instance, in the embodiment shown in FIG. 16b, a section of the cover has been removed to allow inspection of the module within. The end section of cover is not illustrated.

While the cover 6b shown in FIG. 16b is largely supported by the frame 6a, in other embodiments, the cover, or sections thereof, may be designed and constructed form part of the structural frame of the module thereby becoming a structural element.

Force Sensing

The toe also includes sensors for monitoring the magnetic adhesion force between the module and a ferromagnetic material surface. The sensor may take the form of a strain gauge for example.

FIG. 9 shows a schematic configuration of a force sensing resistor 40 (FSR) mounted within the adhesion module 7. The FSR is mounted under the magnet 4 within the housing 7 so that when engaged with a target surface, the FSR is compressed by the magnetic adhesion force between the magnet and the bottom of the housing thereby allowing measurement of the magnetic adhesion force provided by the magnet with the target surface during engagement. Since maximum adhesive force is provided by the adhesion system at zero pull load, the measured adhesive force provides an indication of the potential load bearing capability of the toe prior, to loading. By calculating the potential load bearing capability of each toe on a multi-toed foot, for instance, the three toed foot shown in FIG. 1, invaluable information can be compiled and used by the robot's control system to prevent overloading and inadvertent detachment of the foot from the surface.

In FIG. 9 a pad 41 of a resilient material is positioned between the magnet and the FSR 40. In this cross-section, the contact pad 42 can be seen surrounding the housing 7. FIG. 10 displays an alternative configuration where the FSR 40 is disposed on the outside of the housing under the resilient contact pad 42. This reduces the inherent separation distance in the adhesion module, thereby improving performance.

FIG. 11 shows the use of Hall Effect sensors 45 to measure the magnetic field in the surrounding area of the magnet. A pair of Hall Effect sensors, mounted on either side of the housing, is used to determine the adhesive force and the effective air gap from paint, rust, dirt.

Other sensors may also be used ranging from basic contact sensors to more complex proximity and surface property measuring sensors.

Surface Anchoring Foot

Figure 2:
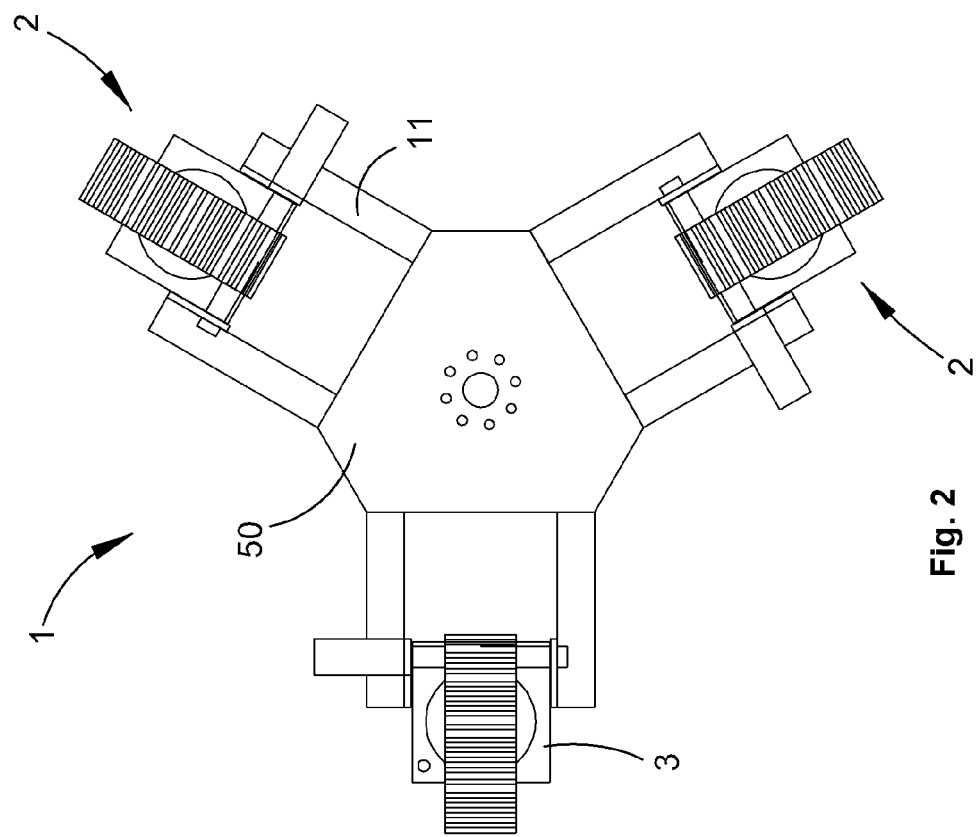
FIG. 2 is a top view of the adhesive foot shown in FIG. 1a, illustrated in the engageable state.

Returning to FIGS. 1a and 1b, the foot 1 includes a foot body 50 and three surface contacting toes 2 mounted to the body in a tripod arrangement. Each toe is mounted on a respective arm comprising a matching pair of arms 11. Each arm extends generally radially from the body 50 around a common central foot axis $A_F$. As seen best in FIGS. 2 and 3, the three toes are disposed in an even circumferentially spaced array around the foot axis such that the included angle between the arms is 120°.

This configuration has been chosen to be suitable for localisation between rivet patterns on particular steel bridges. However, the radius of the frame can be optimised to suit the particular intended physical environmental conditions. These may not only include surface obstacles such as rivet patterns, but also spatial clearance and access parameters such as maximum access hatch dimensions, beam widths and the like.

The foot shown is particularly designed to engage a generally flat planar surface such as flat plate surfaces. However in other embodiments, the toes may be disposed in any required configuration adapted for contacting other shaped surfaces, for instance, concave or convex surfaces as might be encountered on the inside and outside of a pipe respectively.

The use of three toes in a tripod configuration allows the foot a measure of tolerance when engaging irregular surfaces while maintaining lateral stability of the foot on both axes lateral to the foot axis. Further tolerance may be provided by mounting each toe on a limited movement pivotable joint. In alternative embodiments however, any number of toes may be used on the foot in any arrangement. For instance, in some embodiments the foot may include only a single toe and magnetic adhesion module, while in other embodiments more than three toes may be mounted to a single foot.

Each toe is provided with magnetic adhesion module. The magnetic adhesion module includes a magnetic flux generator for projecting a magnetic flux field outwardly toward the engaged surface to interact with any ferromagnetic material underlying the surface and thereby provide the magnetic adhesion force. In this embodiment, each toe is provided with magnetic adhesion module as previously described, having a permanent magnet.

The foot body is constructed from a light weight, rigid material such as aluminium. The body includes a mounting point for mounting control circuitry as well as for mounting the foot to a vehicle.

Each toe includes a dedicated actuator and corresponding bi-directional actuator control circuitry so that each respective magnetic adhesion module can be activated to transition between engaged and unengaged states independently. However, in alternative embodiments a single actuator may be linked to operate each module on the foot simultaneously.

Furthermore, each magnetic adhesion module is equipped with an adhesive force sensing system so that the collective adhesive holding force of the foot can be determined. The foot also includes tilt sensors to determine the spatial orientation of the foot and the angle of the surface to which it is attached with respect to gravitational force. This is particularly useful when determining loading limits in the various adhesive failure modes.

Figure 16C:
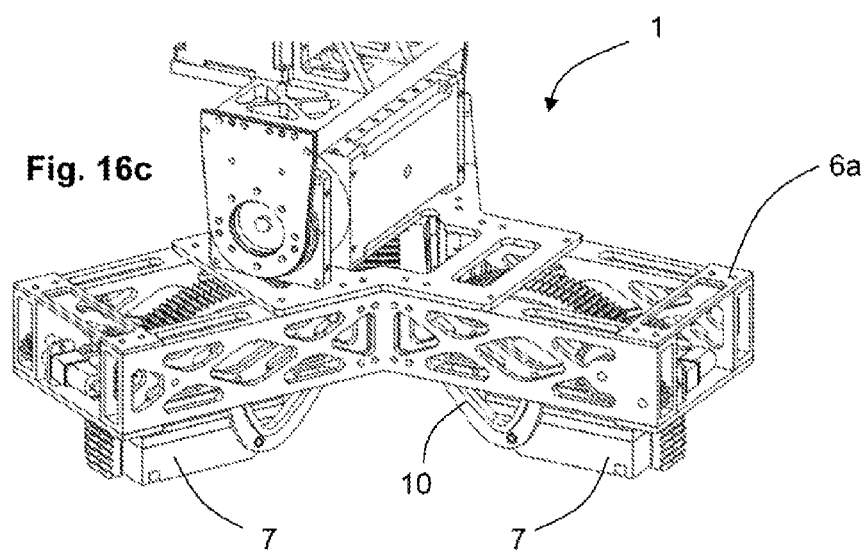

An alternative design of foot incorporating the magnetic adhesion module shown in FIG. 16*c* is shown in FIG. 16*b*.

In other forms of the invention, however, the magnetic adhesion system is replaced or supplemented by other active adhesion systems. These may include one or more of a: chemical adhesion means; electrostatic adhesion means; mechanical adhesion means; and pressure differential adhesion means.

Robot Configuration

As previously discussed, no known climbing robots provide sufficient manoeuvrability in any orientation with respect to gravity, as may be required for traversing complex structures. However, there are many biological creatures which are capable of such manoeuvres. For instance, inchworm caterpillars have been a key inspiration to the design of the climbing robot. They are capable of highly complex 3D transitions including 360° plane transition which can be put down to the hyper-redundancy. Furthermore, inchworms have an adhesion system which provides sufficient adhesion to support them in a cantilevered position, while inspecting a surface for a location in which it can firmly grip with its front legs. By incorporating force sensing in the adhesion system it is possible to guarantee the next step will be secure.

Generally the design for the climbing robot inspired by the inchworm includes an elongate segmented body and an adhesive foot at each end of the body. The robot moves in a repeating cycle of steps ("step cycles"). With the robot anchored to a surface with a first foot, the second is free to reach for a new anchor position in the general direction of intended travel. Once found, the second foot is then engaged allowing the first foot to be disengaged, and repeating the process. Each foot must provide sufficient adhesive force to allow for cantilevered reaching. The body must provide sufficient dexterity to negotiate complex three-dimensional obstacles.

The design process first considers the required mobility and manoeuvrability. This takes into consideration the intended design scenarios for the complex environment and any constraints imposed. After determining the required robot configuration, actuator selection and confirmation is required to determine its feasibility. After selecting suitable actuators, constraints are applied for the adhesion system. The design of the adhesion system considers the intended design scenarios, environmental conditions, robot configuration, robot weight, and actuator torques. With these constraints in mind the adhesion system must be designed as light as possible while maximising safety and robustness.

Inchworms are equipped with biological muscle actuation systems which provide almost analogue control of body segments and high manoeuvrability. However, while similar concepts may be applied, they are generally not practical, economical or necessary in the design of a mechanical robot.

Increasing a robot's manoeuvrability requires increasing its number of hinged joints (degrees of freedom (DOF)). However, an increase in DOF is generally associated with an increase in the number of actuators which will increase weight of the robot. With increased system weight, actuators generally must be upgraded for greater performance specifications to support the increased weight. In turn, upgrading motor performance leads to further increases weight. Once a feasible robot configuration and actuator selection is determined the adhesion system must be considered for the increased system weight. This is the greatest concern because the adhesion systems are located at the end effectors of the robot. Being the greatest distance from the wall when cantilevered, it has the greatest effect on the bending moment force. The final problem is that for any increase in DOF, actuator performance or adhesion performance, an increase in robot size is generally required. With increases in robot size, further increases in bending moment for the robot are also observed. This design process between DOF, actuator selection, and adhesion system is a challenging and iterative process.

In order to observe the extent of the challenge in designing the adhesion and robot, an equation which relates the required bending moment support for adhesion to the total DOF can be derived. The addition of DOFs is associated with increases in both length and weight of the robot, which requires stronger and heavier actuators. Hence, it has been widely observed that the weight is exponentially proportional to DOF.

$$\text{Weight} \propto \text{DOF}^2$$

It can also be said that the relationship between the size of a robot is approximately linear with increases in the DOF.

$$\text{Size} \propto \text{DOF}$$

In the cantilevered scenario, the bending moment which must by sustained by the adhesion system is proportional to the length of the robot times the weight of the robot.

$$\text{Adhesion} \propto \text{Weight} \times \text{Size}$$

Substituting, the bending moment force required by the adhesion system is proportional to the cubic of the DOF.

$$\text{Adhesion} \propto \text{DOF}^3$$

The robot is symmetrical in order to maximise mobility. This means the head of the inchworm robot is arbitrary, and permits the same set of movements to be performed from either foot acting as the base. Control and route planning complexity are simplified as it does not need to consider the best foot placements in order to perform a complex plane transition. In order to maximise mobility the robot should have large reach capability and perform large steps. As seen in FIG. 12a, the robot 100 step size is maximised by placing an Rx orientated joint adjacent each of the robot body; in the simplest form this would be a 2DOF robot.

To achieve the required manoeuvrability the worst case step scenario is considered. The 360° plane transition through a manhole or opening is the most critical and difficult design scenario identified. The addition of a further 1DOF Rx joint to robot 101 allows this plane transition, provided that all actuators can reach ±120° from the centre position, as seen in FIG. 12b. This 3DOF motion provides the most common transitions required during motion and allows the greatest mobility for planar transitions. However, the ability to perform the transition is largely constrained by the link lengths and footpad size. Each foot 1 must be placed toward the edge to prevent collision with the wall. Furthermore, to prevent collision between links, footpad and the surface, the link lengths must be sufficiently long and the actuators must be capable of angles greater than 120°. Finally, this robot configuration is limited to a small range of plate thickness, where increases in plate thickness will cause increases in the angle for joint 1 and 3. With decreases in plate thickness large increases in the angle for joint 2 are required. While actuators may be capable of 360° rotation, the feasible range of rotation is typically limited due to self collision, to around 90-135° in the best case.

Figure 12D:
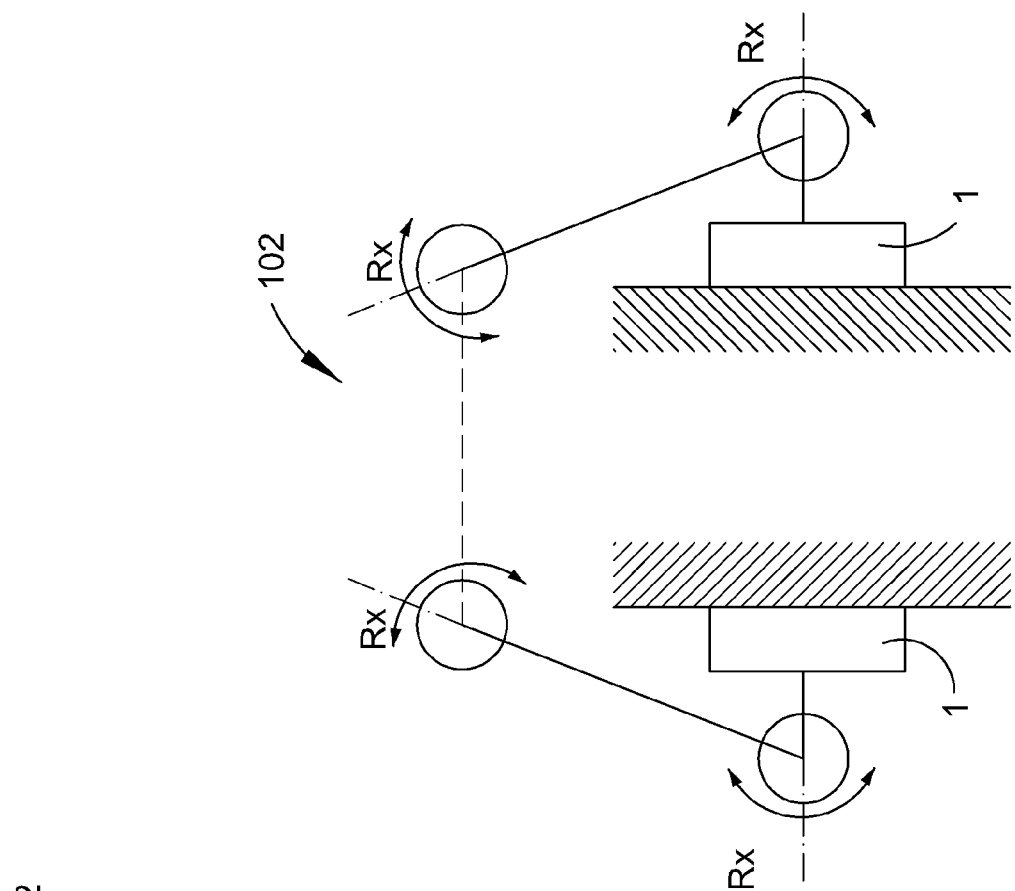
FIG. 12d is a schematic side view illustrating the inchworm robot shown in FIG. 12c and the ability to perform a wide range of plane transitions.
Figure 12C:
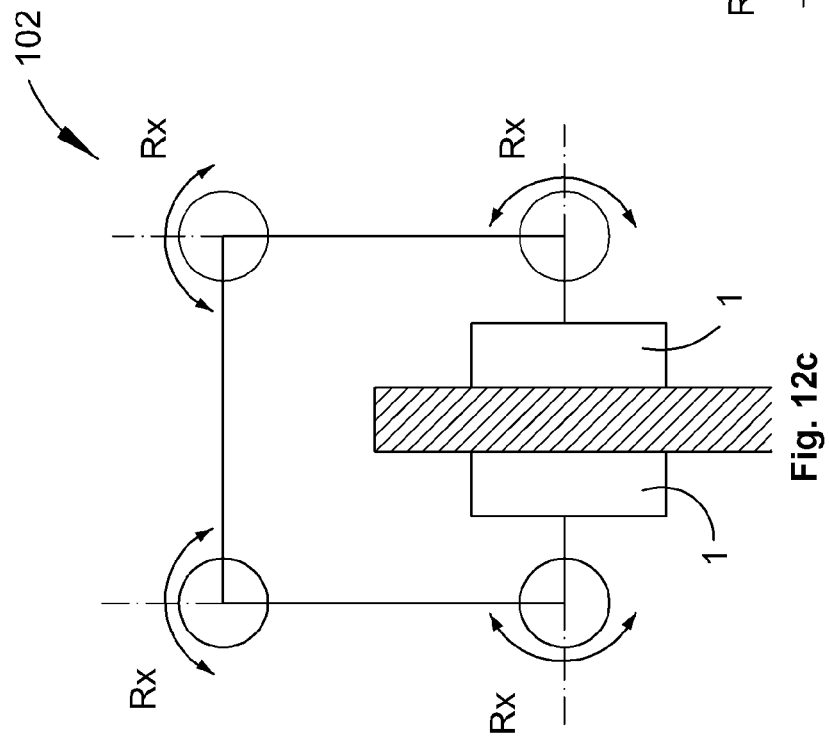
FIG. 12c is a schematic side view illustrating an inchworm robot in accordance with the invention equipped with 4DOF thereby providing added flexibility for performing 360° plane transitions.

In order to robustly perform this transition it can be observed in FIG. 12c that adding a fourth DOF to robot 103 allows each actuator to only be driven to 90° (360°/4DOF) from the centre position. This configuration is not limited by thin sections and allows robot 103 to transition wider planes, as seen in FIG. 12d. Furthermore, this configuration reduces the chance of intersection with the foot pad and allows more successful plane transitions, with fewer constraints on the link lengths.

Figure 14:
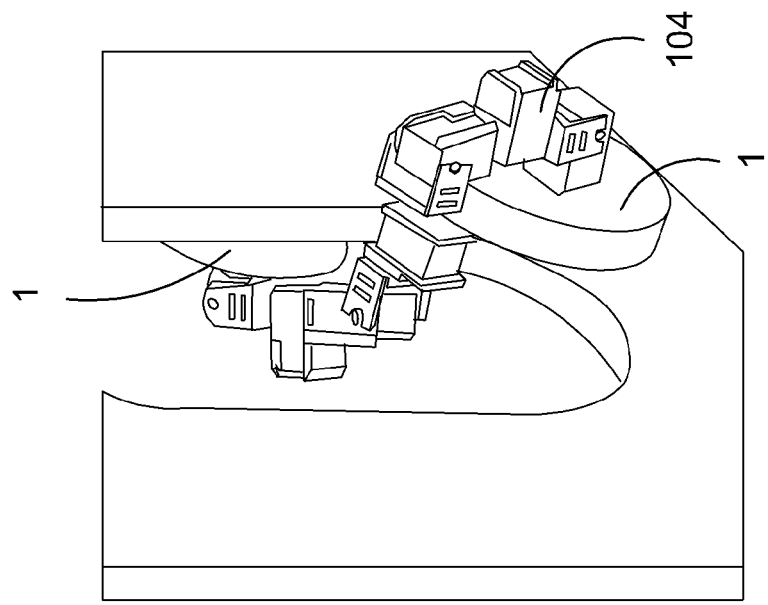
FIGS. 13 and 14 are perspective illustrations of a modelled robot design in accordance with the 7 DOF configuration shown in FIG. 12e.
Figure 13:
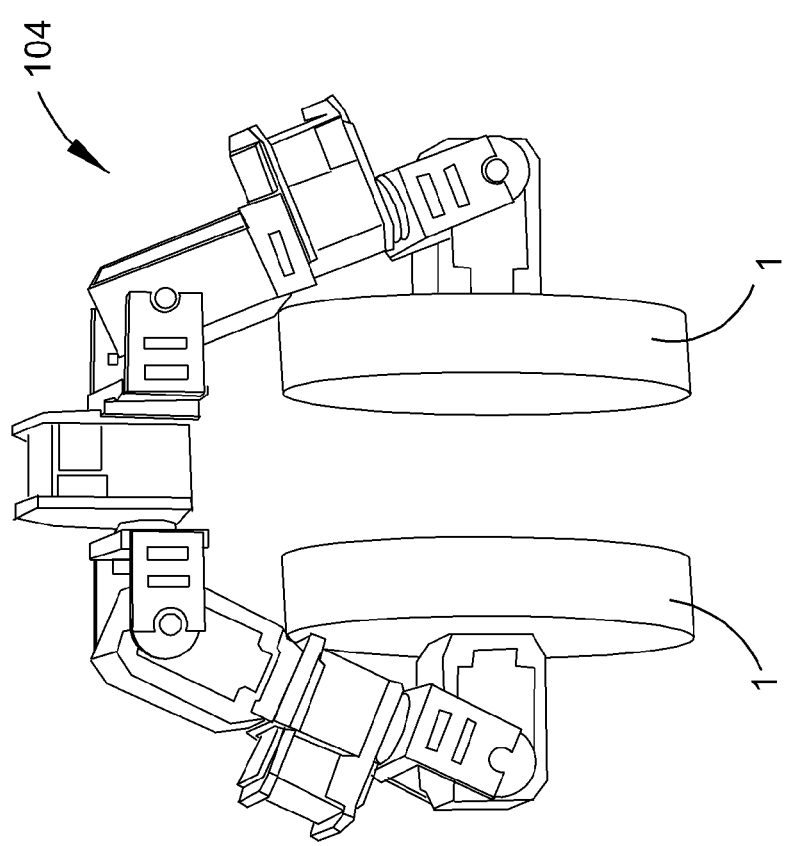

This 4DOF configuration forms the minimum require DOF to robustly perform the 360° transition in one plane. However, further DOF's are required in order for the robot to perform 3D transitions and to move out of plane. With the addition of 1 or 2 DOF's, many 3D transitions are now possible. However, the manoeuvrability is still limited. To maximise manoeuvrability and robustly perform complex 3D transitions, a hyper-redundant 7DOF system by adding a further 3DOF in the Rz orientation is required, as seen in to schematic illustration of robot 104 in FIG. 12e. Furthermore, the additional 3 DOF's do not significantly increase the length of the robot because certain link lengths must be used in order to successfully perform the 360° plane transition due to the radius of the intended foot pad. Furthermore, this hyper-redundant robot does not require ankle joints to yield high surface compliance, although they can be incorporated. This configuration modelled in FIG. 13 allows the robot to perform complex 360° 3D transitions as shown in FIG. 14 considered necessary for mobility.

As noted the inchworm climbing robot provides a high degree of manoeuvrability for traversing complex terrain. However other configurations of legged robots having three or more feet might be considered for other applications.

Robot Control

FIGS. 15a to 15c show the hyper-redundant 7DOF robot 104 in a preferred configuration having a previously described adhesive foot 1 at each distal end. Each foot includes three toe assemblies 2 having a magnetic adhesion system transitionable between an engageable state wherein each adhesion system is configured to actively hold the respective toe to the surface thereby anchoring the foot to the surface and a disengageable state to allow detachment of the foot from the surface.

The vehicle shown may be controlled fully remotely, semi-autonomously or fully autonomously. In order to assist with control, the vehicle control system includes a range of sensing equipment and control processors for scanning, mapping, route planning and decision making, using suitable system software and hardware. One or more of the sensors may provide dual functionality of both control feedback as well as analysing function of the structure in line with the robots purpose.

In this embodiment the vehicle is equipped with a RGBD camera system 105, for colour and depth perception. Using data captured by the camera system, three-dimensional maps may be generated of its surroundings. These maps may be used by an operator to remotely control the vehicle and/or by the vehicle's control system for automated route planning. The camera system may include one or more cameras to capture and overlay other data on the three-dimensional map, including hi-definition visual information, or other electromagnetic spectrum information such as infrared or ultraviolet imaging.

As previously explained, inchworm robots transverse surfaces using a repetitive step cycle whereby a first foot operates as an anchoring support while the second foot searches for and establishes a new anchor point. Each foot must provide sufficient anchor force to support the robot independently to allow the other foot freedom to detach and search for a new anchor position.

In the robot's step cycle, three-dimensional mapping information from is used to identify potential surfaces for anchoring. Once a suitable anchor point within the body's reach is identified, the robot body Rx and Rz joints are manipulated to align the free foot with the surface and bring it into anchoring proximity. At this stage sensors on the free foot may closely examine the surface in respect of its potential anchoring properties. If the surface is satisfactory, the free foot attempts to establish an adhesive anchoring to the surface at the chosen anchor point by transitioning the adhesion system into the engagable state. It is noted that while attractive force is being generated, the robot may still support its entire weight on the previously engaged foot.

Once the foot is engaged to the surface, the force sensors provide data indicative of the magnetic adhesive force $F_m$ generated between each toe assembly and the target surface following foot anchoring. Broadly, this data is used to determine anchor load limit parameters at that location.

However other sensors provide data indicative of the robot's spatial orientation, foot orientation and configuration, and the angle of the surface to which the foot is attached. The data is then combined with known information including the robot's mass distribution and dimensions and analysed by the robot's control system to calculate operational load parameters required to support the robot once the other foot is detached. It is noted that the control system must take into account both the potential static and dynamic loads that would be applied as the robot moves, and factor in the potential failure modes of adhesive anchoring including, with reference to FIG. 6, excessive pull force, $F_p$, slip force, $F_s$, bending moment in the x direction, $M_x$, bending moment in the y direction, $M_y$, and torsion in the z direction, $M_z$. Further, preferably a margin of safety is applied. Applying these factors, the control system determines a set of operational load parameters which can be compared to the actual anchor load limit parameters for that anchor point.

If the set of anchor load limit parameters indicate that anchor point provides sufficient adhesive force to allow an unrestricted envelope of robot operational movement, the first foot can disengage and the process repeated for the next step. Alternatively, the control system may self impose limitations to the operational movement envelope at that anchor point to ensure that maximum load parameters of the foot are not exceeded. Further still, if the control system determines that the anchor point cannot provide sufficient adhesive force to support the robot, or provide an acceptable operational envelope, the robot may disengage the foot and seek new foot placement.

It will be appreciated that the present invention provides a climbing robot capable of traversing and assessing complex structures. The robot is used in the semi-autonomous inspection and condition assessment of steel structures. With the ability to sense adhesion force and anchor soundness of the next anchor point, along with the use of permanent magnets the invention provides almost failsafe attachment to the structure.

It will be appreciated that no such in these and other respects, the invention represents a practical and commercially significant improvement over the prior art.

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing component, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A foot for a climbing vehicle or robot, said foot providing selective anchoring to a surface of a structure and including a surface contacting toe assembly having an adhesion system transitionable between an engageable state, wherein said adhesion system is configured to actively hold said toe assembly to the surface on a plane of engagement thereby anchoring said foot to the structure, and a disengageable state to allow detachment of said foot from said surface;
- wherein said adhesion system includes a magnetic adhesion module having a magnetic field generator for projecting a magnetic field outwardly from the plane of engagement toward said engaged surface when the adhesion system is in the engageable state, to thereby generate a magnetic attractive force between the magnetic adhesion module and a magnetic target material within or beneath the surface of the structure;
- wherein the magnitude of the magnetic attractive force between the magnetic adhesion module and the magnetic target material is substantially greater in the engageable state than in the disengageable state, thereby enabling selective magnetic adhesion of said adhesion system with said target material;
- wherein the magnitude of said magnetic attractive force between the magnetic adhesion module and the target material is substantially zero in the disengageable state;
- wherein said magnetic adhesion module includes switching means for modifying the magnetic field such that when the adhesion system is in the engageable state, a net magnetic flux at the surface is greater than when the adhesion system is in the disengageable state;
- wherein said magnetic field generator includes a permanent magnet having a magnetic axis and said switching means includes an actuator for physically moving said permanent magnet between a first position corresponding to said engageable state and second position corresponding to said disengageable state.

2. A foot according to claim 1 wherein said magnet is retained within a housing, said housing hingedly mounted on said toe assembly about a peel axis for peelable transition between the first and second positions.

3. A foot according to claim 2 wherein said peel axis is disposed at or adjacent a peripheral edge of said permanent magnet and said magnetic axis is rotated around 90° between first and second positions.

4. A foot according to claim 1 wherein said magnet is presented in close proximity to said surface in the first position and comparatively withdrawn from said surface in the second position.

5. A foot according to claim 4 wherein each toe includes a cover to prevent the accumulation of ferromagnetic dust on the magnetic field generator and/or gear train.

6. A foot according to claim 1 wherein said toe assembly includes a sensor for monitoring the magnetic attractive force.

7. A foot according to claim 6 wherein said sensor includes any one or more of a force-sensitive resistor; a piezo electric force sensor; or a hall effect sensor.

8. A foot according to claim 1 including a plurality of surface contacting toe assemblies configured in a surface contacting array.

9. A foot according to claim 8 including a foot body and a central foot axis, said plurality of surface contacting toe assemblies configured in a generally planar, circumferential array around a central foot axis.

10. A foot according to claim 9 having three toe assemblies arranged in a tripod configuration.

11. A surface anchoring vehicle or robot having at least one foot according to claim 1, preferably two or more feet and preferably two feet.

12. A surface anchoring vehicle or robot having at least one surface anchoring foot according to claim 7, the toe assembly being equipped with sensing means operatively connected to a control system, said sensing means for measuring the adhesion force generated with the engaged surface to determine anchor load limit parameters.

13. A surface anchoring vehicle or robot according to claim 12 wherein said control system compares anchor load limit parameters against calculated operational load parameters prior to operational loading of said foot.

14. A foot according to claim 2, wherein said peelable transition is actuated by a geared drive system.

15. A foot for a climbing vehicle or robot, said foot providing selective anchoring to a surface of a structure and including a surface contacting toe assembly having an adhesion system transitionable between an engageable state, wherein said adhesion system is configured to actively hold said toe assembly to the surface on a plane of engagement thereby anchoring said foot to the structure, and a disengageable state to allow detachment of said foot from said surface;
- wherein said adhesion system includes a magnetic adhesion module having a magnetic field generator for projecting a magnetic field outwardly from the plane of engagement toward said engaged surface when the adhesion system is in the engageable state, to thereby generate a magnetic attractive force between the magnetic adhesion module and a magnetic target material within or beneath the surface of the structure;
- wherein said magnetic adhesion module includes switching means for modifying the magnetic field;
- wherein said magnetic field generator includes a permanent magnet having a magnetic axis and said switching means includes an actuator for physically moving said permanent magnet between a first position corresponding to said engageable state and second position corresponding to said disengageable state.

16. A foot according to claim 15 wherein said permanent magnet is retained within a housing, said housing hingedly mounted on said toe assembly about a peel axis for peelable transition between the first and second positions.

17. A foot according to claim 16 wherein said peel axis is disposed at or adjacent a peripheral edge of said permanent magnet for rotating said permanent magnet between first and second positions.

18. A foot according to claim 15 wherein said magnet is presented in close proximity to said surface in the first position and comparatively withdrawn from said surface in the second position.

19. A foot according to claim 16, wherein said peelable transition is actuated by a geared drive system.

20. A surface anchoring vehicle or robot having at least one foot according to claim 15.

21. A surface anchoring vehicle or robot having at least two feet according to claim 15.

* * * * *